United States Patent [19]
Anderson et al.

[11] Patent Number: 5,913,670
[45] Date of Patent: Jun. 22, 1999

[54] BREAKAWAY LINKS FOR UNDERWATER GEAR

[76] Inventors: Erik S. Anderson, 38 Georges Ter., Portsmouth, N.H. 03801; Peter Martin Anderson, 1061 Neil Ave., Columbus, Ohio 43201

[21] Appl. No.: 08/770,592

[22] Filed: Dec. 19, 1996

[51] Int. Cl.[6] .................................................. A01K 75/00
[52] U.S. Cl. .............................................. 43/4.5; 43/43.12
[58] Field of Search .................................. 43/43.12, 43.1, 43/44.83, 4.5; 24/3.4, 597, 908

[56] References Cited

U.S. PATENT DOCUMENTS

| | | | |
|---|---|---|---|
| 2,326,876 | 8/1943 | Miller | 43/43.12 |
| 2,768,468 | 10/1956 | Kibler | 43/44.83 |
| 3,488,877 | 1/1970 | Carabasse | 43/43.12 |
| 3,541,720 | 11/1970 | Buffet | 43/43.12 |
| 3,648,398 | 3/1972 | Newell | 43/43.12 |
| 3,925,921 | 12/1975 | Tucker | 43/43.12 |
| 4,696,121 | 9/1987 | Hernden | 43/43.1 |
| 4,858,369 | 8/1989 | Collins | 43/43.1 |
| 5,076,006 | 12/1991 | Kahng | 43/43.12 |
| 5,461,821 | 10/1995 | Carter | 32/43.12 |

*Primary Examiner*—Kurt Rowan
*Attorney, Agent, or Firm*—Dennis H. Rainear

[57] ABSTRACT

The invention relates to a breakaway link and a system for its use in conjunction with underwater gear, such as fishing nets, to prevent the prolonged entanglement and subsequent stress, harm to or death of cetaceans, including whales. The breakaway link system comprises underwater gear and at least one link which will rupture, break or experience calculated material failure upon receiving sufficient load induced by the force or struggling of the entangled cetacean. The breaking of the link frees the animal from the underwater gear, thereby reducing or eliminating the risk of severe stress, injury or death to the cetacean.

1 Claim, 6 Drawing Sheets

BREAKAWAY LINKS FOR UNDERWATER GEAR

TECHNICAL FIELD

The invention relates to a breakaway link system for use in conjunction with underwater obstruction, such as fishing gear, to prevent the entanglement and subsequent stress, harm to or death of large cetaceans (eg. whales). The calculated breaking of the link frees the cetacean from the underwater obstruction, thereby reducing or eliminating the risk of stress, severe injury or death to the cetacean.

BACKGROUND OF THE INVENTION

A problem recently documented in the fishing industry is the entanglement of Right Whales, Humpback Whales and other cetaceans in various underwater obstructions, such as fixed fishing gear, sink gillnets, lobster trawls, longline fishery, and the like. These animals have been known to become entangled with the buoy lines that attach fishing gear from the surface to the sea bottom where the gear is located. In such instances of entanglement, the animal is often injured or severely stressed and this can lead to death of the animal. Entanglement can cause the animal to begin towing not only the buoy and buoy line, but also the fixed gear that is associated with the buoy. The weight of that fishing gear, as well as the drag resistance from movement of the gear through the water, limits the ability of the animal to maneuver and resurface for air. The size and strength of the animal lets it continue for a limited time but under great strain and stress.

Recent federal legislation (ESA and MMPA) has imposed stricter standards on the fishing industry to protect marine mammals, to evaluate the health and stock of each species, and to develop recovery plans. One potential solution to the problem of cetacean entanglement is the banning of underwater fishing gear. This would, however, have a devastating economic impact on the thousands of fisherman and their coastal communities, and in turn affect related businesses and ultimately the general public.

Thus, a need exists for a system or device that will reduce the possibility of stress, injury and death of various cetacean species from conflict and entanglement with underwater gear. The system should be inexpensive, readily available, non-toxic to fish and other aquatic life, and adaptable to a wide variety of applications, fishing gear, buoys, lines, traps, and equipment.

SUMMARY OF THE INVENTION

The present invention provides a solution to the problem of cetaceans, including but not limited to whales, experiencing severe stress, injury or death resulting from their entanglement in underwater gear. By "cetaceans" herein is meant whales, dolphins and porpoises, however, "cetacean" and "whale" may be used interchangeably herein.

One object of the present invention is to reduce the possibility of stress, injury or potential mortality of cetaceans which become entangled in underwater gear and buoy lines.

More specifically, one embodiment the present invention comprises a breakaway link or releasable system for use in conjunction with underwater gear, such as but not limited to gillnets, lobster trawls, quahog traps, clam, crab and oyster traps or sleds, fishing weirs, and long line fishery equipment. The use of the present invention is not limited to fishing gear, but can also be used in conjunction with any underwater equipment, device or system where entanglement by whales is a potential problem. In addition to the above-mentioned articles, "underwater gear" herein also includes any water column obstruction.

By "entangled" herein is meant any contact, engagement, snagging, entanglement, ensnaring, netting, tangling, snarling, catching, or the like, whereby the cetacean cannot release itself and swim away from the underwater gear or obstruction.

DETAILED DESCRIPTION OF THE INVENTION

The breakaway link of the present invention comprises a piece of material which can be broken, ripped, or otherwise divided by the administration of a specific load or stress induced upon it by the force of pull from an entangled aquatic species. The breakaway link in one embodiment of the present invention can be placed in the buoy line at a location in the water column near the floating buoy used to indicate the location of the undersea gear. In addition, or in the alternative, the breakaway link can be placed at a location in the buoy line very near the gear on the sea bed. Once a whale becomes entangled in the line or gear, the whale's efforts and force to leave and/or release itself create a load or stress on the line and the breakaway link or links placed in the line. The breakaway links of the present invention are designed to fail at specific calibrated loads so that the underwater gear is not inadvertently severed by standard hauling procedures, storms, or small fish, but is only severed by a force equal to that of a struggling or thrashing whale that has come into contact with said gear and attempts to tow it.

Thus, the present invention is directed to a system for the release of at least one cetacean, such as a whale, from entanglement in underwater gear comprising:

a) underwater gear, and b) connected to said gear, at least one breakaway link which will break when at least one cetacean becomes entangled in said gear.

The present invention is also directed to a method to reduce the injury to whales or other cetaceans entangled in underwater gear, said method comprising (a) incorporating into said gear at least one breakaway link that exhibits calculated material failure, (b) entangling a whale or other cetacean in said gear, (c) release of said whale or cetacean upon the administration to said link of a load generated by the struggling of said entangled whale or cetacean. By "calculated" herein is meant predictable and reproducible. In this manner, the whale or other cetacean is released with less stress, injury or risk of death than would result if the breakaway link were not incorporated into the gear.

The present invention is further directed to a device useful for incorporation into the buoy line or fishing gear comprising a body made of a material selected from the group consisting of epoxy resin or polymer, acrylics, acrylates, nylon, polyesters, polybutylene terephthalates, polyethylenes, polyimides, polyamides, carbonates, polysulfones, urethanes, and copolymers thereof, metals and their alloys, and composites thereof, and laminates thereof, said body having two locations for connection to said buoy line or fishing gear, and wherein said body has between said two connection locations a narrowed portion or thinned portion, or both, at which breaking occurs upon the administration of sufficient load.

The device used in the system of the present invention can be engineered to vary the separation or failure load, thereby making it adaptive to a variety of industry applications.

The material used for the breakaway link can be any environmentally friendly material, such as but not limited to, plastic, pressed paperboard, metals and their alloys, laminated paper or wood, or other polymeric material. It is desirable that the material for the link be inert in a salt water environment, and relatively incapable of leaching any chemical components or reactants into the environment. The material should exhibit little or no change in strength and impact resistance due to exposure to salt water, sunlight and UV radiation, temperature variations, and excessive heat from the sun. Preferably, the material exhibits recoverable or elastic flexibility up to its terminal load point. However, a large amount of permanent deformation such as stretching is not desired, although tolerable. The ideal material should withstand single or repeated application of a load with marginal or no physical change until the terminal load point is reached.

The preferred material is inexpensive, easily machined or extruded, and readily available. The preferred material for the link is any of the common engineering organic polymers or plastics, such as, but without limitation, epoxy resin or polymer, acrylics, acrylates, nylon, polyesters, polyethylenes, polybutylene terephthalates, polyimides, polyamides, carbonates, polysulfones, urethanes, and the like and copolymers thereof, composites thereof, and laminates thereof. Also useful in the present invention as the material for the breakaway link are inorganic materials such as flexible metals and metal alloys, metal foil laminates, metal composites, and the like. Combinations of organic polymers and inorganic or metallic materials are also effective in the present invention as the material for the breakaway link. Finally, the preferred material must be capable of consistent performance to provide fracture at a calculated and predictable terminal load point to assure its purpose in mitigating entanglement.

In one example of the present invention, the breakaway link is shaped like a "dogbone", such that a notched, etched, abraded, cut, or otherwise narrowed and/or thinner portion is presented at which the intended material failure will occur upon entanglement and a sufficient subsequent fracture load applied. Thus, the breakaway link can be thinned at one section or point between the points of attachment to the fishing buoy line or gear, or the link can be narrowed or constricted at such a section or point. It is also useful according to the present invention for the breakaway link to be both thinned in its thickness and narrowed in width at the designed point of failure. It is clear that other shapes, designs and geometric figures, both two dimensional and three dimensional, are possible for the design of the breakaway links and all are included within the scope of the present invention.

In another embodiment of the present invention, the breakaway link comprises at least one length of material which can be fashioned into a loop connecting two or more portions of a fishing or other underwater gear, such as a fishing line, buoy line or net.

In another example of the present invention, the aforementioned loop-shaped embodiment comprises a length of natural or synthetic material such as nylon or other plastic, in the form of a rope, cable, etc. The two ends of the rope or cable can be equipped with a means for fastening said ends to each other to thereby close the loop. The fastening means herein can be but is not limited to a "hook & eye" connection, or two hooks able to interconnect to each other, or other fastener means known to those skilled in the art. The attachment of each fastening means to the end of each breakaway link loop end can be by means of crimping with metal brads, sleeves, staples, or tight wrapping with wire, or hot melting of the plastic loop material, or other attachment means known in the art.

In another embodiment, the breakaway link of the present invention is constructed from a section of rope that has been partially cut or otherwise narrowed in cross sectional area, so as to fail at a predictable load point.

Yet another embodiment is a ball & socket means whereby the load induced by the struggling and entangled whale is sufficient to distress or deform either the ball or the socket, or both, such that the ball is freed from the socket. This embodiment can also be designed so that the ball or socket is not permanently destroyed, but reverts to its original shape upon the release of the load induced by the whale. This can be achieved by forming the ball or socket or both from a plastic or rubber with sufficient elastic property. In an alternative embodiment, the ball and socket can be rigid but the socket can be equipped with a rubber or elastic collar which can be deformed under the terminal load so that the ball can be released, thereby allowed the struggling whale to be freed.

Figure 1:
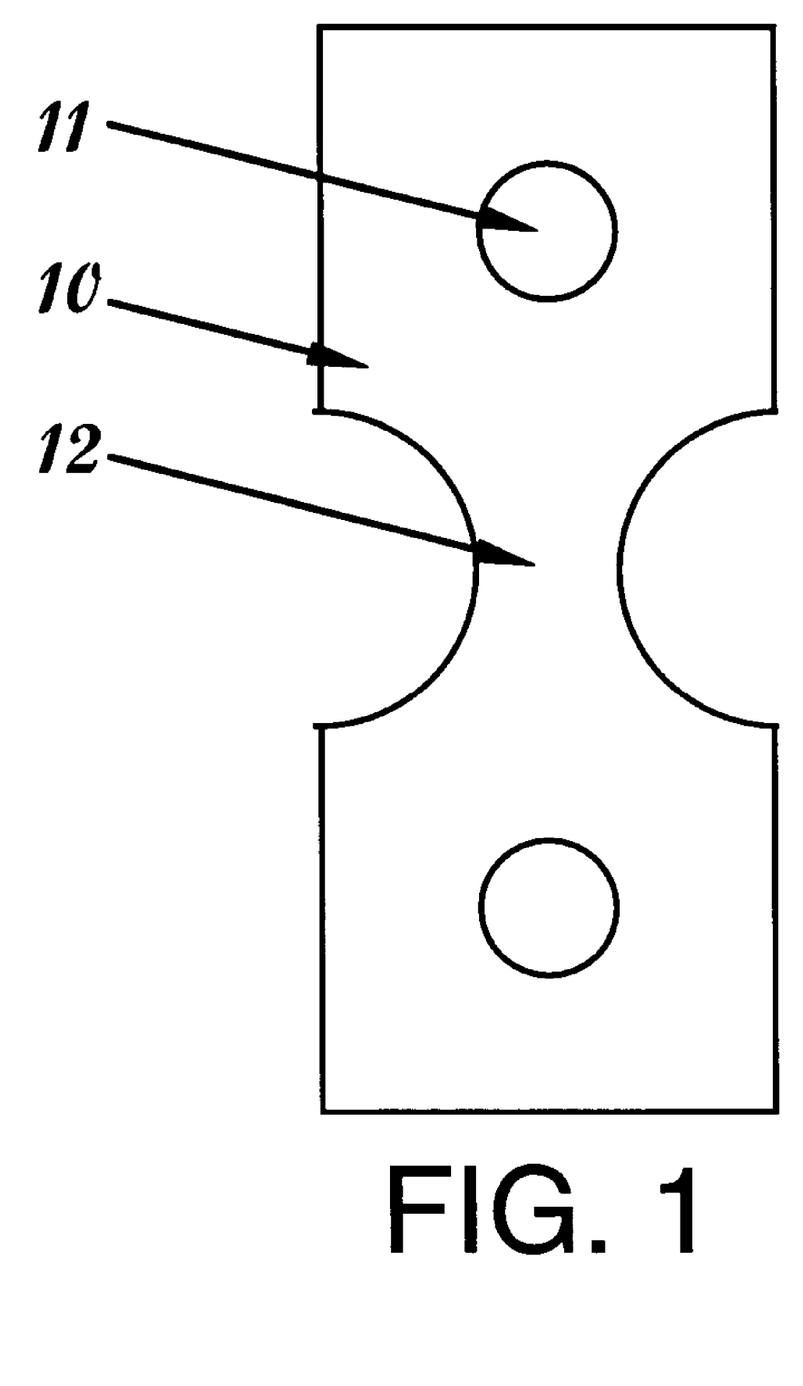
FIG. 1 illustrates one embodiment of a breakaway link of the present invention.

FIG. 1 depicts a "dogbone" body It and illustrates the location of attachment openings 11 through which the body 10 is attached to the buoy line. The load point 22 is narrower or thinner or both than the remainder of the body 31 thereby creating a weak point for the designed material failure of the breakaway link. FIG. 1 citation of the present invention and is merely illustrative of one of many possible shapes and geometric designs of the present invention. The body 10 of the link can be planar, or tubular, or cuboidal, or any other shape or conformation without restriction or limitation. Thus, the constriction or reduction in cross sectional area which facilitates failure can be arbitrarily shaped within the present invention. In addition, the body 10 can have more than one location where the cross sectional area is reduced.

Figure 2:
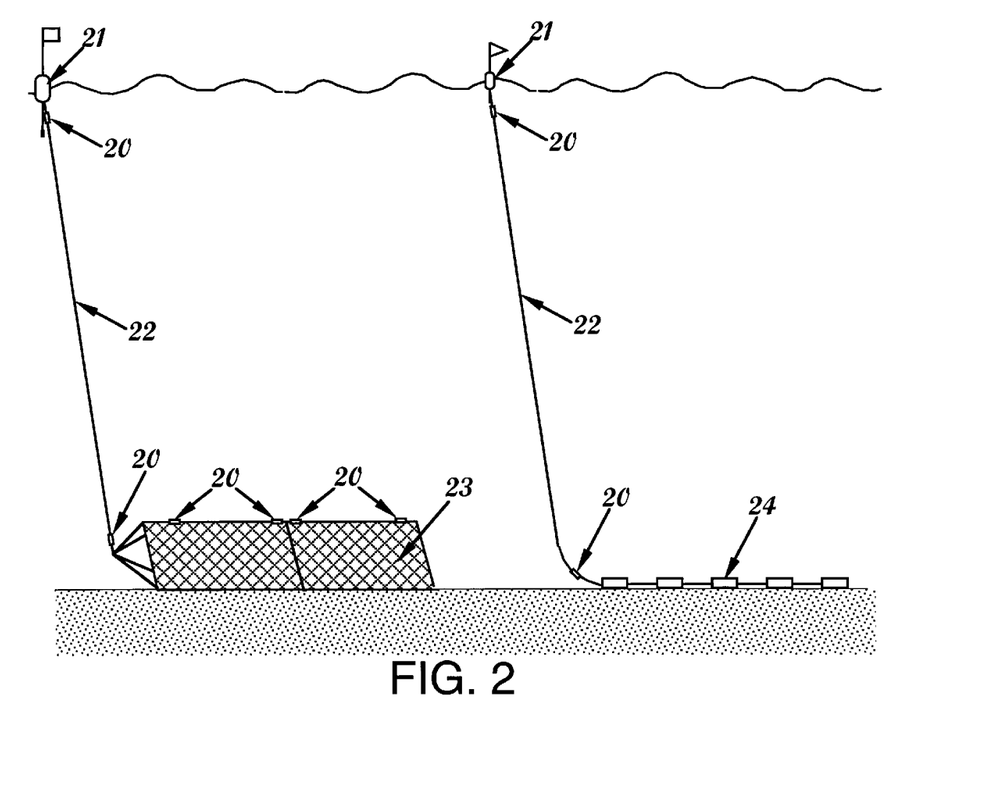
FIG. 2 illustrates the use of the breakaway links of the present invention attached to floating buoys and to underwater fishing gear.

FIG. 2 depicts breakaway links 20 used in conjunction with floating buoys 21, buoy lines 22, a sink gillnet 23, and a lobster trawl 24. FIG. 2 is not a limitation of the present invention and is merely illustrative of one of many possible uses and orientations of the present invention. As illustrated in FIG. 2, the breakaway links of the present invention can be used at locations near the buoys on the surface of the sea, at locations near the gear on the sea floor, or anywhere in the water column, or if the design of the gear is adaptable, the breakaway links can be incorporated into the gear or fish net itself. The latter embodiment is particularly effective if the net is a series of connected nets or other pieces whereby severance of one net or piece from another net or piece is desired to reduce or minimize the trauma or potential mortality to the entangled cetacean.

Figure 3:
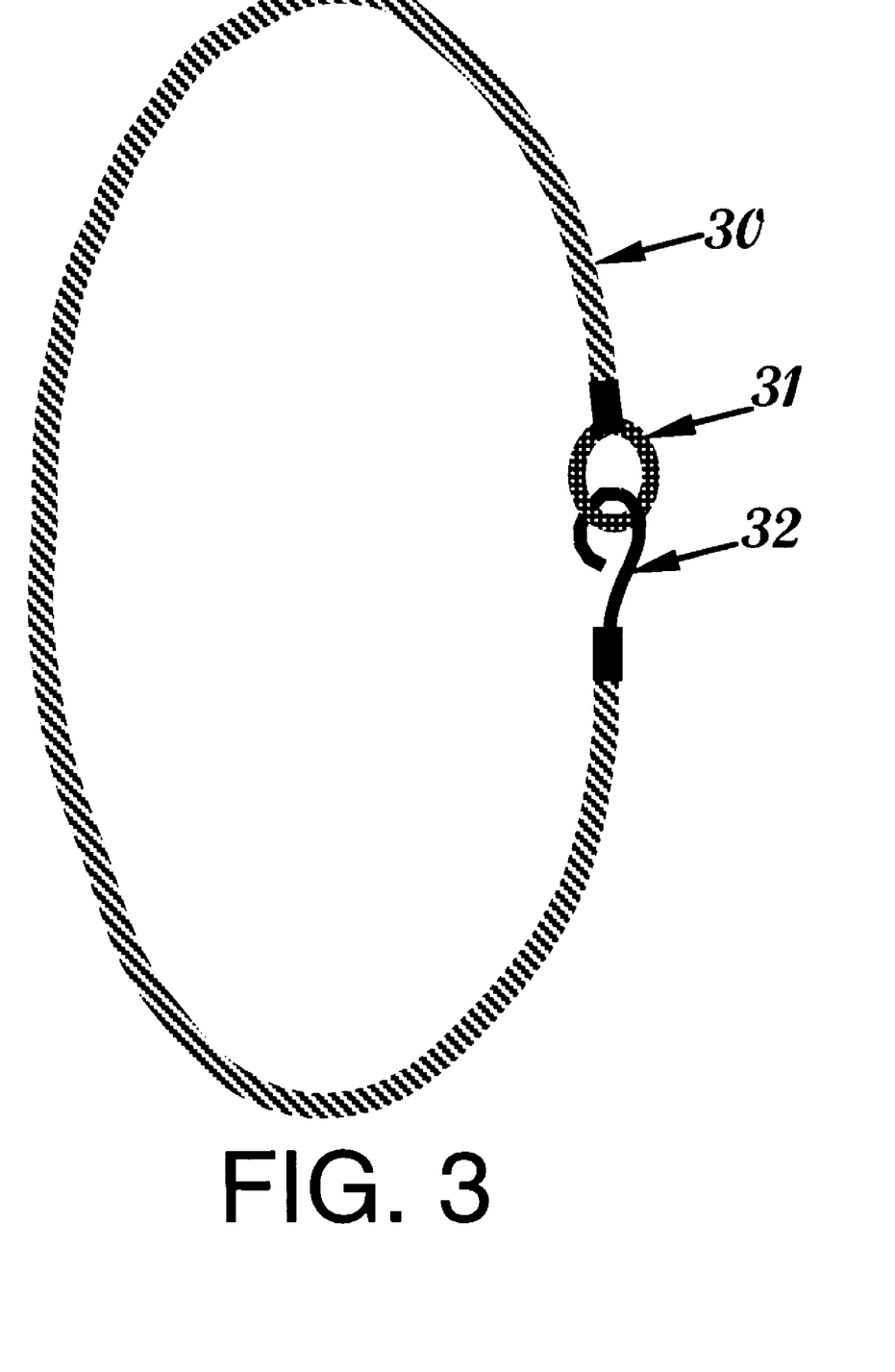
FIG. 3 illustrates a loop-shaped embodiment of the breakaway links of the present invention.

FIG. 3 depicts a loop 30 of material forming a breakaway link in which the two ends 31 and 32 of the loop 30 constitute fastening means which can be various hook assemblies to hold the two ends together to thereby form a closed loop which holds together the separate sections of buoy line, fishing line, nets, or other underwater gear. FIG. 3 is not a limitation of the present invention and is merely illustrative of one of many possible embodiments of the present invention.

Figure 4:
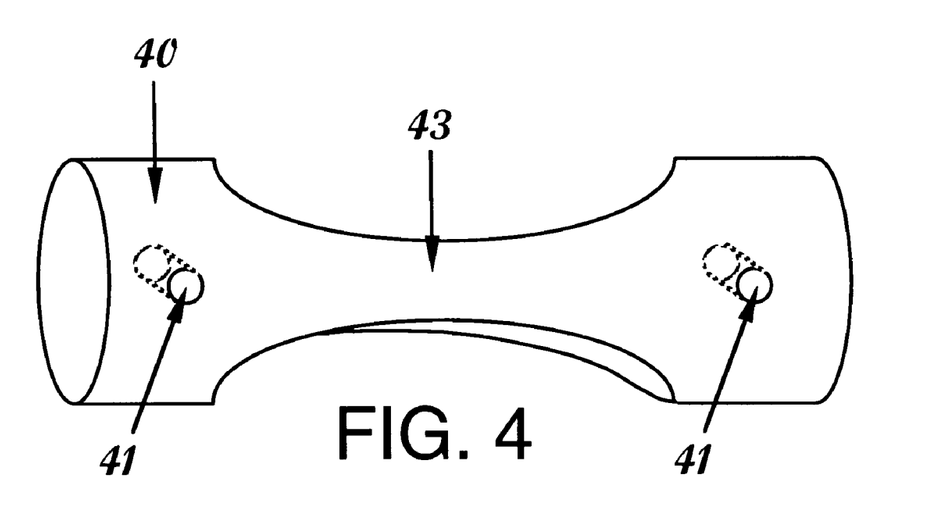
FIG. 4 illustrates a rod shaped link of the present invention with holes drilled to create designed weakness.

FIG. 4 depicts an example of a round stock link 40 into which has been drilled perpendicular to the length two openings 4R for attachment of the fishing lines or buoy lines. Centered between the openings is a load point or "gage" portion 43 of the round stock link 40, wherein the reduced diameter of said load point is, for example, about 0.171 to about 0.5 inches if the round stock 40 is about 1 inch in diameter. FIG. 4 is not a limitation of the present invention and is merely illustrative of one of many possible embodiments of the present invention.

Figure 5A:
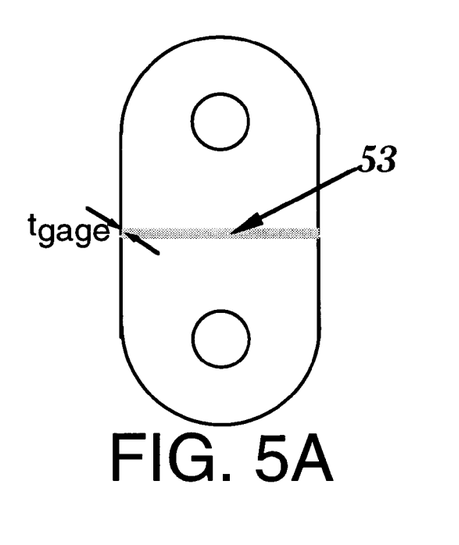
FIG. 5 illustrates a flat stock embodiment of the present invention.

FIGS. 5(a), (b), (c) and (d) depict examples of flat stock links into which have been drilled two openings for attachment of the fishing lines or buoy lines, between which is a narrowed portion accomplished by (a) reducing the thickness 53 of the flat stock, (b) reducing the width 54 of the stock at a single location, (c) a combination 55 of cases (a) and (b), or (d) reducing the width 56 of the stock at multiple locations and/or perforations.

Figure 6:
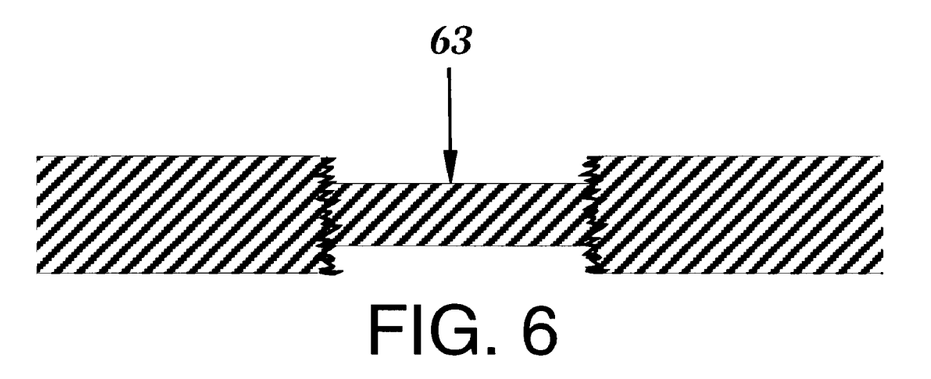
FIG. 6 illustrates a rope embodiment of the present invention.

FIG. 6 depicts a section of a rope which has a weakened portion 63 produced by (a) the reduction of the cross sectional area of fiber bundles constituting the rope, or (b) the cutting of a subset of the fiber bundles in the rope.

The examples depicted in the FIGURES are not intended in any way to be viewed as limitations of the present invention, but rather, as illustrations of some of the several possible shapes and geometric designs within the scope of the present invention.

Thus, the present invention is also directed to a device useful for incorporation into fishing buoy lines or fishing gear comprising a body made of a material selected from the group consisting of epoxy resin or polymer, acrylics, acrylates, nylon, polyesters, polyethylenes, polybutylene terephthalates, polyimides, polyamides, carbonates, polysulfones, urethanes, and copolymers thereof, and composites thereof, metals and their alloys, and laminates thereof, said body comprising a length of said material having fastening means for connecting to said fishing buoy line or fishing gear or for connecting two ends of said material to each other, and wherein said body has a portion for breaking upon the administration of sufficient load.

The tensile load applied by a struggling whale to the buoy line in which it is entangled can vary depending on the size and strength of the whale, and the number of whales entangled, among other factors. The phrase "terminal load point" as used herein means the magnitude of tensile load applied to the buoy line and the incorporated breakaway link which is sufficient to cause the link to experience material failure and thus sever or rupture at its calculated weak point. The material failure can be cohesive failure or, if two pieces are used adhesively to comprise the link, adhesive failure. Adhesive failure can also be engineered into the loop-shaped embodiment of the present invention, whereby the activity of the whale is sufficient to cause the fastening means, such as 33 or 32, to detach, thereby freeing the whale.

The breakaway links of the present invention are not limited by size and can be any size effective for the purpose recited herein. The size of the breakaway links can vary with the design, shape and material of construction. Thus, for example and without limitation, the round and flat stock embodiments of the present invention can conveniently be from about two inches to twenty-four or more inches in length. Similarly, the loop embodiment can range in length from several inches to several feet, and the weakened rope embodiment can range from a sharp cut of negligible length along or across an existing buoy line to a weakened section of several feet in length.

The breakaway link of the present invention must not break during normal fishing use of the gear, installation of the gear or intentional dragging of the underwater gear. Thus, the links must withstand the conventional dragging weight of the gear as it is hauled across and upward from the sea floor without the link breaking. Commercial rope used in such applications, often called "potwop", has a typical tensile failure of about 1800 pounds, but it can range as high as 11,300 pounds depending on certain deep water applications. Clearly these break points can be considered excessive for permitting entangled whales to break free. Therefore, it is useful in the utilization of the present invention to have a breakaway link with a break point or terminal load point of greater than 50 pounds to survive normal gear installation and use, but less than about 11,300 pounds. Depending on the species and number of whales in a particular ocean area, a tensile failure or terminal load point as large as 2500 pounds or higher may be required. A great range of operational variations (i.e., shallow water vs. deep water, single trap or net vs. multiple connected units of fishing gear) which can be accomplished upon request by the user through engineering and production changes. More preferably, the breakaway links of the present invention should have a terminal load point ranging from 100 to 2500 pounds, and most preferably from 150 to 2000 pounds.

It is often preferred but not required that when a plurality of breakaway links is used in a system according to the present invention, the links in the buoy line near the surface or adjacent or near the buoy have a smaller failure load of at least 100 pounds, for example. It is also preferred but not required that in such a system with a plurality of breakaway links, the links located in the buoy line at a position near the sea floor or near or adjacent the fishing gear or other underwater gear have a larger failure load point of at least 1500 pounds, for example.

Figure 5B:
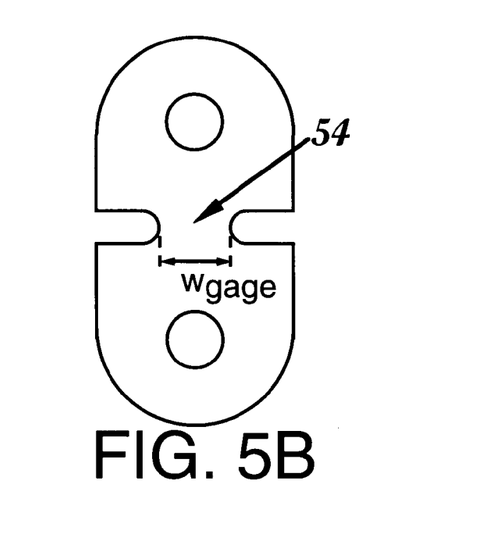
Figure 5C:
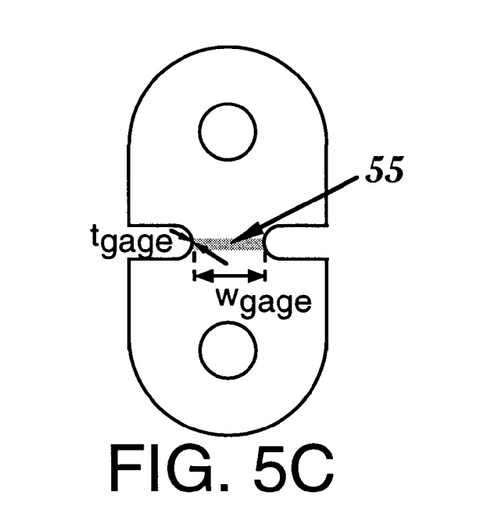
Figure 5D:
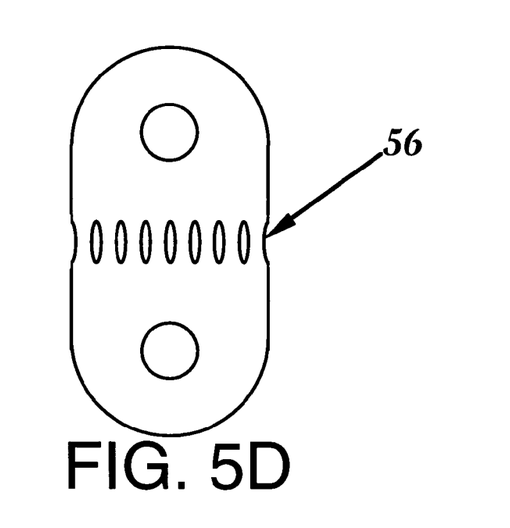

In one example of the present invention, a planar or sheet-type of link of FIG. 5(a) was prepared from 0.375 inch thick Hydex 4101 polybutylene terephthalate sheet material available from A. L. Hyde Co. This link, which was w=1.25 inches wide by l=2.75 inches long with rounded ends and two holes for attaching the fishing line to the link, was then machined at its central area 53 to a reduced thickness of $t_{gage}$=0.110 inches. This embodiment exhibited a terminal load point of 1500 pounds, when monotonically stretched in tension to failure in an Instron Model 1322 mechanical testing system, at temperatures of approximately 32 degrees F and 72 degrees F. Similar results were obtained when the thickness was not reduced in the central area, but rather a reduced width 54 of $w_{gage}$=0.367 inches was machined in the central area, as depicted in FIG. 5(b).

In another example, a planar or sheet-type link of FIG. 5(a) was prepared from 0.250 inch thick high molecular weight polyethylene material, available from Poly Hi Solidur. This link had dimensions of w=1.25 inches wide by l=2.75 inches long with rounded ends and two holes for attaching the fishing line to the link. In one version, a reduced thickness of $t_{gage}$=0.100 inches was machined at the center 53. This embodiment exhibited a terminal load point of approximately 450 pounds, when monotonically stretched in tension to failure in an Instron Model 1322 mechanical testing systems, at temperatures of approximately 32 degrees F. and 72 degrees F. Similar results were obtained when the thickness was not reduced in the central area, but rather a reduced width of $w_{gage}$=0.500 inches was machined in the central area 54 as depicted in FIG. 5(*b*).

A round bar type design of the breakaway link of FIG. 4 was prepared from Hydex 4101 material available from A.L. Hyde Co. The Hydex round stock was 1 inch in diameter and was cut to a 4 inch length. This piece was then machined to have two holes to connect the fishing lines, said holes being 0.50 inches in diameter and each hole was located ⅜ inch from an end of the round stock piece. A region 43 of reduced diameter, $D_{gage}$=0.342 inches, was machined between the holes using a radius of curvature, k=0.500 inches, as depicted in FIG. 4. This reduced diameter connection or isthmus 43 served as the location for the designed failure of the link device. This breakaway link embodiment exhibited a terminal load point of approximately 1075 pounds when monotonically stretched in tension to failure in an Instron Model 1322 mechanical testing systems, at temperatures of approximately 32 degrees F and 72 degrees F.

In a similar manner, round stock rods of Hydex or other engineering plastic, composite materials, laminates, flexible metals, and the like can be machined to have larger or smaller values of $D_{gage}$ for the "weakening" effect to create corresponding larger or smaller tensile failure load points. For example, if $D_{gage}$=0.404 inches is used rather than 0.342 inches, the tensile failure load point would be approximately 1500 pounds, and if $D_{gage}$=0.171 inches is used instead, the tensile failure load point would be approximately 270 pounds.

It is therefore clear that the present invention provides devices which can be engineered to possess designed performance characteristics including tensile failure load points. This is highly desired in the fishing industries to minimize or eliminate the problem of whale entanglement in underwater gear.

While the invention has been disclosed in this patent application by reference to the details of preferred embodiments and examples of the invention, it is to be understood that this disclosure is intended in an illustrative rather than in a limiting sense, as it is contemplated that modifications will readily occur to those skilled in the art, and such modifications by the skilled artisan are within the spirit of the invention and the scope of the claims which follow. Various modifications may be adopted without departing from the literal scope. Equivalent structures and structural equivalents are clearly contemplated as within the scope of the disclosed and claimed invention.

That which is claimed is:

1. A method to reduce the injury to whales or other cetaceans entangled in underwater gear, said method comprising (a) incorporating into said gear at least one breakaway link that exhibits calculated material failure, (b) entangling a whale or other cetacean in said gear, (c) release of said whale or cetacean upon the administration to said link of a load generated by the struggling of said entangled whale or cetacean.

* * * * *